Jan. 7, 1936.   P. HIGGINS   2,026,679
FLOWERPOT DRAIN PLUG
Filed July 19, 1935

INVENTOR.
Pattillo Higgins
BY
ATTORNEY.

Patented Jan. 7, 1936

2,026,679

UNITED STATES PATENT OFFICE 2,026,679

FLOWERPOT DRAIN PLUG

Pattillo Higgins, San Antonio, Tex.

Application July 19, 1935, Serial No. 32,169

2 Claims. (Cl. 47—34)

This invention relates to new and useful improvements in flower pot drain plugs.

One object of the invention is to provide an improved plug which is arranged to be inserted into the usual flower pot directly over the drain opening in the bottom of said pot, and which will assure efficient drainage of the water from the soil in the pot and which will also aid in plant growth.

An important object of the invention is to provide an improved drain plug adapted to be inserted in the usual flower pot, said plug having its drain openings so located that the soil within the flower pot does not exert a direct pressure upon said openings, whereby danger of the openings becoming clogged to prevent drainage is eliminated.

Another object of the invention is to provide an improved drain plug which will permit efficient drainage of water while preventing soil from passing from the flower pot in a sufficient quantity to impair root development, said plug also serving to prevent the water from channeling through the soil.

A still further object of the invention is to provide an improved drain plug which is arranged to be inserted over the drain opening in the bottom of a flower pot and having a plurality of drain orifices, the aggregate area of the orifices being substantially equal to the cross sectional area of the flower pot drain opening, whereby the drainage of water from the pot is not impeded.

A construction designed to carry out the invention will be hereinafter described, together with other features of the invention.

Figure 1:
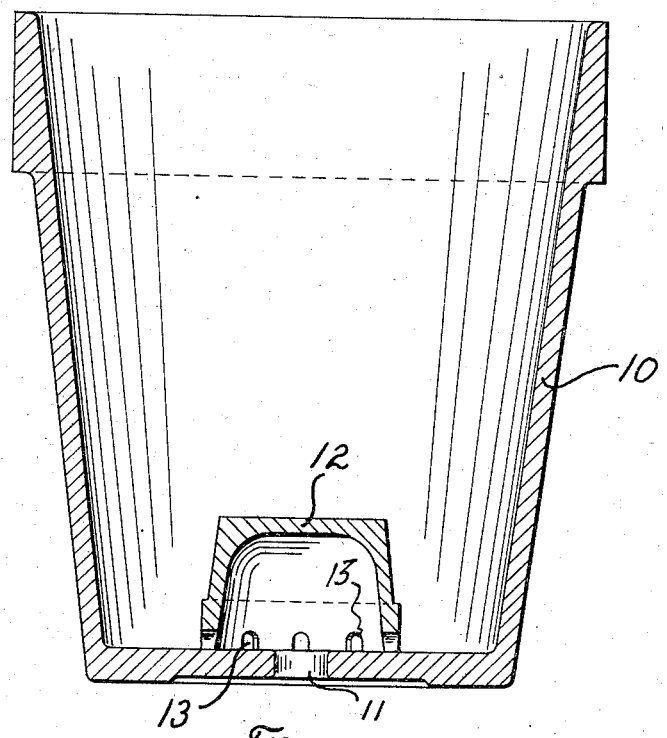
Figure 2:
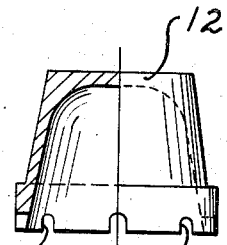
Figure 4:
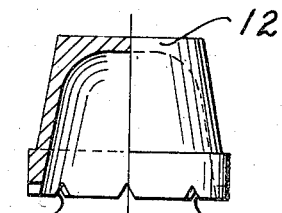
Figure 3:
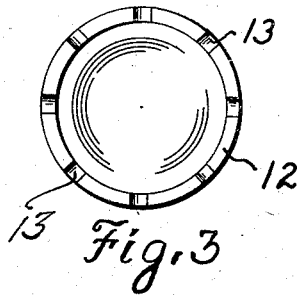
Figure 5:
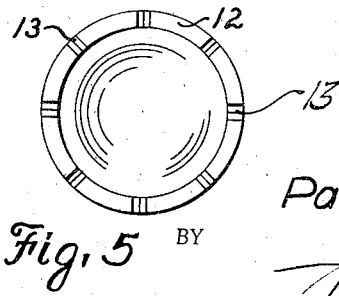

The invention will be more readily understood from a reading of the following specification and by reference to the accompanying drawing, in which an example of the invention is shown, and wherein:

Figure 1 is a transverse, vertical, sectional view of a flower pot having the drain plug, constructed in accordance with the invention, located therein, Figure 2 is a view partly in elevation and partly in section of the drain plug, Figure 3 is an underside view of the plug, Figure 4 is a view partly in elevation and partly in section of another form of drain plug, and Figure 5 is an underside or bottom view of the same.

In the drawing, the numeral 10 designates a flower pot of the usual construction. The pot may be made of baked clay or other suitable material, being preferably flared outwardly toward its upper end. The bottom of said flower pot is provided with an axial opening 11. As is well known, the pot is filled with soil and the plant or flower is planted therein. The water which is entered into the soil will, of course, seep downwardly therethrough and any excess will escape through the drain opening 11 in the bottom thereof. It has been found that since the pressure of the soil is directly upon the opening 11, that the opening 11 becomes clogged to prevent proper drainage from the pot. Also, since the opening must be comparatively large, soil will escape therethrough, and the escape of such soil will impair root development. Also, due to the location of the opening 11, the water will channel through the soil.

To overcome the above disadvantages, a drain plug 12 is provided. This plug may be made of any suitable material and is in the form of a vertical truncated cone, and has its lower end or bottom open. This cone is inserted in the flower pot so that it covers the drain opening 11, the open bottom thereof resting on the bottom of the flower pot. The lower edge of the plug is provided with a plurality of radial notches 13 which are spaced around said plug. When the cone is in position within the flower pot, it will be obvious that these notches form orifices through which drainage may be had. It is pointed out that after the plug has been positioned as described, so as to cover the drain opening 11, the aggregate area of the orifices is substantially equal to the cross sectional area of the drain opening 11, whereby the same amount of drainage may be had through the orifices as may be had through the single, central opening 11.

After the plug is properly located within the flower pot, the soil is entered into said pot in the way to completely cover the plug. It will be obvious that since the notches 13 are located in the wall of the plug that the horizontal axis of said notches is at substantially a parallel to the bottom of the flower pot. Since the pressure of the soil is exerted at substantially a right angle to the bottom of the pot, it will be obvious that there is no direct pressure of the soil upon the notches. Therefore, there is no danger of the soil being forced into the notches to clog the same, thereby preventing clogging of said notches and permitting unobstructed drainage through the orifices. It will be seen that the plurality of reduced orifices, although permitting substantially the same drainage as the enlarged opening 11, will prevent an undue amount of soil from escaping from the flower pot which aids root development.

Due to the inclined sides of the plug 12 as well as to the disposition of the notches 13 in its lower edge, the plant roots will not bore towards and through the orifices, which will further prevent said orifices from becoming clogged to impede drainage. In Figures 1 to 3 the notches have been shown as having their upper ends curved, but it is pointed out that the particular shape of the notches is subject to variation. In Figures 4 and 5 the notches have been shown as substantially V-shaped, and it has been found that notches of this shape will produce the improved results. Therefore, the notches may be rectangular, square, or any other desired shape so long as they are located at the lower peripheral edge portion of the plug. By locating the plug as shown and forming the same in the shape of a truncated cone, the pressure of the soil is not directly upon the orifices at the lower end thereof. Therefore, the orifices will not become clogged under any conditions, and positive and efficient drainage is assured.

What I claim and desire to secure by Letters Patent is:

1. A drain plug for a flower pot consisting of, a hollow frusto-conical imperforate body having its lower end open and arranged to be placed over the drain opening of said flower pot, said body having a plurality of drain orifices in its lower peripheral edge portion, the aggregate area of said orifices being substantially equal to the area of the drain opening of the flower pot.

2. A drain plug for a flower pot consisting of, a hollow frusto-conical imperforate body having its lower end open and arranged to be placed over the drain opening of said flower pot, said body having a plurality of drain orifices in its lower peripheral edge portion, the aggregate area of said orifices being substantially equal to the area of the drain opening of the flower pot, said body also having an external annular shoulder at its lower end, the upper end of said shoulder extending above the orifices, whereby the pressure of the soil within the flower pot is not directed against said orifices.

PATTILLO HIGGINS.